(12) United States Patent
Athineos et al.

(10) Patent No.: US 7,672,838 B1
(45) Date of Patent: Mar. 2, 2010

(54) SYSTEMS AND METHODS FOR SPEECH RECOGNITION USING FREQUENCY DOMAIN LINEAR PREDICTION POLYNOMIALS TO FORM TEMPORAL AND SPECTRAL ENVELOPES FROM FREQUENCY DOMAIN REPRESENTATIONS OF SIGNALS

(75) Inventors: Marios Athineos, New York, NY (US); Hynek Hermansky, Martigny (CH); Daniel P. W. Ellis, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 1149 days.

(21) Appl. No.: 11/000,874

(22) Filed: Dec. 1, 2004

Related U.S. Application Data

(60) Provisional application No. 60/525,947, filed on Dec. 1, 2003, provisional application No. 60/578,985, filed on Jun. 10, 2004.

(51) Int. Cl.
*G10L 19/06* (2006.01)
*G10L 19/00* (2006.01)
*G10L 15/00* (2006.01)

(52) U.S. Cl. .................. 704/209; 219/231; 219/235; 219/236; 219/251

(58) Field of Classification Search ............. 704/231, 704/235, 236, 251, 219, 209
See application file for complete search history.

(56) References Cited

U.S. PATENT DOCUMENTS

| | | | | |
|---|---|---|---|---|
| 4,856,068 | A * | 8/1989 | Quatieri et al. ............. 704/227 |
| 5,491,771 | A | 2/1996 | Gupta et al. | |
| 5,651,090 | A * | 7/1997 | Moriya et al. ............ 704/200.1 |
| 5,745,873 | A * | 4/1998 | Braida et al. ................ 704/222 |
| 5,774,559 | A * | 6/1998 | Feng ............................ 381/56 |
| 5,787,387 | A | 7/1998 | Aguilar | |
| 5,848,384 | A * | 12/1998 | Hollier et al. ............... 704/231 |
| 6,073,093 | A | 6/2000 | Zinser, Jr. | |
| 6,091,773 | A * | 7/2000 | Sydorenko ............. 375/240.03 |
| 6,115,684 | A | 9/2000 | Kawahara et al. | |
| 6,183,030 | B1 | 2/2001 | Stender et al. | |
| 6,311,153 | B1 | 10/2001 | Nakatoh et al. | |
| 6,424,939 | B1 | 7/2002 | Herre et al. | |
| 6,502,069 | B1 * | 12/2002 | Grill et al. ................... 704/219 |

(Continued)

OTHER PUBLICATIONS

Athineos et al., "Frequency-domain linear prediction for temporal features," Proc. IEEE ASRU Workshop, St. Thomas, US Virgin Islands. Dec. 2003.

(Continued)

*Primary Examiner*—Richemond Dorvil
*Assistant Examiner*—Eric Yen
(74) *Attorney, Agent, or Firm*—Wilmer Cutler Pickering Hale and Dorr LLP

(57) ABSTRACT

In accordance with the present invention, computer implemented methods and systems are provided for representing and modeling the temporal structure of audio signals. In response to receiving a signal, a time-to-frequency domain transformation on at least a portion of the received signal to generate a frequency domain representation is performed. The time-to-frequency domain transformation converts the signal from a time domain representation to the frequency domain representation. A frequency domain linear prediction (FDLP) is performed on the frequency domain representation to estimate a temporal envelope of the frequency domain representation. Based on the temporal envelope, one or more speech features are generated.

9 Claims, 13 Drawing Sheets

U.S. PATENT DOCUMENTS

| | | | |
|---|---|---|---|
| 6,680,972 B1* | 1/2004 | Liljeryd et al. | 375/240 |
| 6,718,301 B1* | 4/2004 | Woods | 704/233 |
| 6,721,698 B1* | 4/2004 | Hariharan et al. | 704/203 |
| 7,127,389 B2* | 10/2006 | Chazan et al. | 704/205 |
| 7,177,803 B2 | 2/2007 | Boillot et al. | |
| 2003/0187635 A1 | 10/2003 | Ramabadran et al. | |
| 2003/0187663 A1* | 10/2003 | Truman et al. | 704/500 |
| 2004/0054526 A1* | 3/2004 | Chazan et al. | 704/206 |

OTHER PUBLICATIONS

Athineos et al., "Sound texture modeling with linear prediction in both time and frequency domains," In Proc. ICASSP, vol. 5, pp. 648-651. 2003.

Athineos et al., "PLP2: Autoregressive modeling of auditory-like 2-D spectro-temporal patterns," Submitted to SAPA-04, Jeju Island, Korea. Oct. 2004.

Brown, "The acoustic-modeling problem in automatic speech recognition," Ph.D. dissertation, Computer Science Department, Carnegie Mellon University. 1987.

Cetin et al., "Cross-stream observation dependencies for multi-stream speech recognition," Eurospeech, Geneva, Switzerland. 2003.

Cole et al., "Spoken letter recognition", Advances in Neural Information Processing Systems 3, Morgan Kaufmann Publishers, Inc., pp. 385-390. 1990.

Dubnov et al., "Synthesizing sound textures through wavelet tree learning," IEEE CGA, vol. 22, No. 4, pp. 38-48, Jul./Aug. 2002.

Goodwin, "Residual Modeling in Music Analysis-Synthesis," Proc. ICASSP, vol. 2, pp. 1005-1008. 1996.

Hermansky et al., "Analysis and synthesis of speech based on spectral transform linear predictive method," Proc. ICASSP, vol. 8, pp. 777-780. Apr. 1983.

Hermansky, "Should recognizers have ears?," Speech Communication, vol. 25, pp. 3-27. 1998.

Hermansky et al., "TRAPS—Classifiers of temporal patterns," Proc. ICSLP, Sydney, Australia. 1998.

Hermansky, "Exploring temporal domain for robustness in speech recognition," Proc. of 15th International Congress on Acoustics, vol. II, Trondheim, Norway. Jun. 1995.

Hermansky et al., "Temporal patterns (TRAPs) in ASR of noisy speech," Proc. ICASSP, vol. 1, pp. 289-292. Mar. 1999.

Hermansky et al., "RASTA processing of speech", IEEE Trans. Speech and Audio Processing, vol. 2, No. 4, pp. 578-589. Oct. 1994.

Hermansky et al., "Tandem Connectionist feature extraction for conventional hmm systems," Proc. ICASSP, Istanbul, Turkey. 2000.

Hermansky, "Perceptual linear predictive (PLP) analysis of speech," J. Acoust. Soc. Am. vol. 87(4). Apr. 1990.

Herre et al., "Enhancing the performance of Perceptual Audio Coders by using Temporal Noise Shaping (TNS)," Proc. 101st AES Conv. Nov 1996.

Jain et al., "Beyond a single critical-band in TRAP based ASR," Proc. Eurospeech, Geneva, Switzerland. Nov. 2003.

Kay, "Modern Spectral Estimation: Theory & Application," Prentice-Hall. 1988.

Klein et al., "Robust spectro-temporal reverse correlation for the auditory system: Optimizing stimulus design," J. Comput. Neurosci, vol. 9. 2000.

Koenig et al., "The sound spectrograph," J. Acoust. Soc. Am., vol. 18, No. 1, pp. 19-49. 1946.

Makino et al., "Recognition of consonant based on the perception model," Proc. ICASSP, Boston, MA. 1983.

Markel et al., "Linear Prediction of Speech," Springer-Verlag. 1976.

Rabiner et al. "Digital processing of speech signals," Prentice Hall. 1978.

Saint-Arnaud et al., "Analysis and Synthesis of Sound Textures," Computational Auditory Scene Analysis, D.F. Rosenthal and H.G. Okuno Eds., pp. 293-308, LEA. 1997.

Schwarz et al., "Recognition of phoneme strings using TRAP technique," Proc. Eurospeech, Geneva, Switzerland. Sep. 2003.

Serra, "Musical sound Modeling with Sinusoids plus noise," Musical Signal Processing, G. De Poli et al., Ed. Swets & Zeitlinger. 1997.

Shamma et al., "Ripple analysis in ferret primary auditory cortex: I. Response characteristics of single units to sinusoidally rippled spectra," Aud. Neurosci, vol. 1. 1995.

Sharma et al., "Feature extraction using non-linear transformation for robust speech recognition on the AURORA data-base," Proc. ICASSP, Istanbul, Turkey. 2000.

Somervuo et al., "Feature transformations and combinations for improving ASR performance," Eurospeech, Geneva, Switzerland. 2003.

Terhardt, "On the perception of periodic sound fluctuation (roughness)," Acustica, vol. 30, pp. 201-213. 1974.

Thornburg et al., "A flexible Analysis-Synthesis Method for Transients," Proc. ICMC. 2000.

Tribolet et al., "Frequency domain coding of speech," IEEE Trans. ASSP, vol. 27, No. 5, pp. 512-530. Oct 1979.

Verma et al., "Transient Modeling Synthesis: a flexible analysis/synthesis tool for transient signals," Proc. ICMC, vol. 2, pp. 164-167. 1997.

Non Final Office Action for U.S. Appl. No. 11/090,728, mailed Nov. 29, 2007.

Rodet, X. "Musical Sound Signal Analysis/Synthesis: Sinusoidal+Residual and Elementary Waveform Models," TFTS, 1997.

Harma, A. "Audio coding with warped predictive methods," Helsinki University of Technology, 1998.

Non Final Office Action for U.S. Appl. No. 11/090,728, mailed on Aug. 27, 2008.

* cited by examiner

SYSTEMS AND METHODS FOR SPEECH RECOGNITION USING FREQUENCY DOMAIN LINEAR PREDICTION POLYNOMIALS TO FORM TEMPORAL AND SPECTRAL ENVELOPES FROM FREQUENCY DOMAIN REPRESENTATIONS OF SIGNALS

CROSS REFERENCE TO RELATED APPLICATION

This application claims the benefit under 35 U.S.C. §119 (e) of U.S. Provisional Patent Application Nos. 60/525,947, filed Dec. 1, 2003, and 60/578,985, filed Jun. 10, 2004, which are both hereby incorporated by reference herein in their entireties.

STATEMENT REGARDING FEDERALLY SPONSORED RESEARCH OR DEVELOPMENT

The government may have certain rights in the present invention pursuant to grants from the Effective, Affordable, Reusable Speech-to-Text (EARS-NA) program at the Defense Advanced Research Projects Agency (DARPA), Contract No. MDA972-02-1-0024.

FIELD OF THE INVENTION

The present invention generally relates to sound recognition. More particularly, the present invention relates to modeling audio signals for speech recognition, sound encoding and decoding, and artificial sound synthesis.

BACKGROUND OF THE INVENTION

In recent years, automatic speech recognition (ASR) systems have been employed in a wide variety of areas, such as, for example, telephone dialing, directory assistance, order entry, home banking, database inquiry, and dictation. For example, cellular telephones commonly employ ASR systems to simplify the user interface. Using ASR systems, many cellular telephones recognize and execute commands to initiate an outgoing phone call or answer an incoming phone call. For example, a cellular telephone having an ASR system may recognize a spoken name from a phone book or a contact list and automatically initiate a phone call to the phone number associated with the spoken name.

In an ASR system, a user speaks into a microphone (i.e., inputs a speech signal). The inputted analog signal is digitized and the blocks of digital data are then transformed from the time domain into the frequency domain using a digital signal processing (DSP) chip. Once the ASR system has digitized the signal and calculated certain parameters, the system compares the signal to a library of known phrases and finds the closest match.

To extract the features from the signal for comparison with data in the library, such ASR systems generally use short-term spectral features, such as mel-frequency cepstral (i.e., frequency-related) coefficients (MFCC). MFCCs are based on a Fast Fourier Transform (FFT), which converts the inputted signal from a time domain representation to a frequency domain representation. The MFCC representation is an example of an approach that further analyzes the FFT of the signal. The MFCC representation is generated by using a mathematical transformation called the cepstrum which computes the inverse Fourier transform of the log-spectrum of the speech signal.

These ASR systems uniformly employ short-time spectral analysis, usually over windows of about 10 to 30 milliseconds, as the basis for acoustic representations. It should be noted, however, that the detailed time structure below this timescale is lost and the time structure above this level is weakly represented in the form of deltas. The temporal structure in sub-10 millisecond transient segments contains important cues for both the perception of natural sounds as well as the understanding of stop bursts in speech. The gross temporal distribution of acoustic energy in windows of up to 1 second is a successful domain for the recognition of complete phonemes and the description of their dynamics. Thus, while the spectral structures resulting from the spectral analysis convey important linguistic information, they are only a partial representation of speech signals.

Other feature extraction techniques, such as, for example, dynamic (delta) features and relative spectra processing technique (RASTA), have been adopted as post-processing techniques that operate on sequences of the short-term feature vectors. Such techniques provide a "locally-global" view in which features to be used in classification are based upon a speech segment of about one syllable's length.

Accordingly, it is desirable to provide systems and methods that overcome these and other deficiencies of the prior art.

SUMMARY OF THE INVENTION

In accordance with the present invention, computer implemented methods and systems are provided for representing and modeling the temporal structure of audio signals.

In accordance with some embodiments of the present invention, computer implemented methods and systems of extracting speech features from signals for use in performing automatic speech recognition are provided. In response to receiving a signal, a time-to-frequency domain transformation on at least a portion of the received signal to generate a frequency domain representation is performed. The time-to-frequency domain transformation converts the signal from a time domain representation to the frequency domain representation. A frequency domain linear prediction (FDLP) is performed on the frequency domain representation to estimate a temporal envelope of the frequency domain representation. Based on the temporal envelope, one or more speech features are generated.

In some embodiments, the time-to-frequency domain transformation is performed by applying a discrete cosine transform (DCT) or a discrete Fourier transform on the portion of the received signal.

In some embodiments, the frequency domain linear prediction may include selecting a temporal window to apply the linear prediction and automatically determining a pole rate to distribute poles for modeling the temporal envelope. The poles generally characterize the temporal peaks of the temporal envelope. The pole rate may be automatically determined to capture both gross variation and stop burst transients of the signal.

In some embodiments, an index of sharpness may be extracted from each of the poles. The index of sharpness of the FDLP poles $\{\rho_i\}$ is defined as $$\rho_i = \frac{1}{1-|\rho_i|}.$$

In some embodiments, the frequency domain linear prediction is performed by estimating the square of the Hilbert envelope of the signal or calculating the inverse Fourier transform of the magnitude-squared Fourier transform of a portion of the frequency domain representation raised to a given power. When the given power is 1, the autocorrelation of the single sided (positive frequency) spectrum is calculated. Alternatively, when the given power is not 1, the pseudoautocorrelation is calculated. The autocorrelation of the spectral coefficients may be used to predict the temporal envelope of the signal.

In accordance with some embodiments of the present invention, the frequency domain representation may be divided into a plurality of frequency bands. A FDLP polynomial may then be fitted to each of the plurality of frequency bands. Temporal envelopes may be extracted from each of the plurality of frequency bands using the fitted FDLP polynomial.

In some embodiments, the frequency domain representation may be divided by logarithmically splitting the frequency domain representation into the plurality of frequency bands.

In accordance with some embodiments of the present invention, computer implemented methods and systems of extracting speech features from signals are provided. In response to receiving a signal, a time-to-frequency domain transformation on at least a portion of the received signal to generate a frequency domain representation is performed. The time-to-frequency domain transformation converts the signal from a time domain representation to the frequency domain representation. The frequency domain representation may be divided into a plurality of frequency bands and a FDLP polynomial may be fitted to each of the plurality of frequency bands. Temporal envelopes may be extracted from each of the plurality of frequency bands using the fitted FDLP polynomial. Spectral envelopes may be constructed by taking simultaneous points in the temporal envelopes. A smooth envelope may be fitted to each of the spectral envelopes. Based on the temporal and spectral envelopes, one or more speech features are generated. This is sometimes referred to herein as "PLP$^2$ modeling."

These methods and systems for modeling the temporal structure of the signal may be used to improve sound recognition (in particular, speech recognition), sound encoding and decoding, and artificial sound synthesis.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements.

DETAILED DESCRIPTION OF THE PREFERRED EMBODIMENTS

Figure 1:
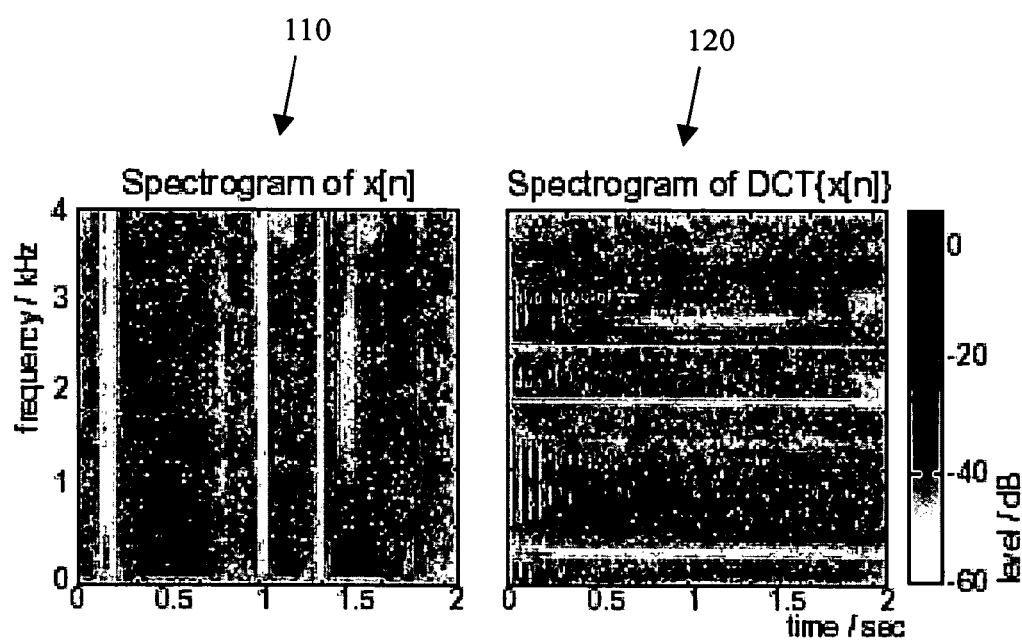
FIG. 1 is a simplified illustration of a spectrogram of a speech sample and a spectrogram of the discrete cosine transformation (DCT) of the speech sample in accordance with some embodiments of the present invention.

The following description includes many specific details. The inclusion of such details is for the purpose of illustration only and should not be understood to limit the invention. Moreover, certain features which are well known in the art are not described in detail in order to avoid complication of the subject matter of the present invention. In addition, it will be understood that features in one embodiment may be combined with features in other embodiments of the invention.

In accordance with the present invention, computer implemented methods and systems are provided for representing and modeling the temporal structure of audio signals. More particularly, the methods and systems provide a compact representation of an audio signal that includes substantial detail about its temporal structure such that accurate modeling, classification, recognition, and/or resynthesis may be performed In some embodiments, a representation of the temporal envelope in different frequency bands is provided by exploring the dual of linear prediction when applied in the transform domain. With this technique of frequency domain linear prediction, the poles of the model describe temporal, rather than spectral, peaks. By using analysis windows on the order of hundreds of milliseconds, a processor may perform a procedure that automatically determines how to distribute poles or the pole rate to best model the temporal structure within the window. By taking an index describing the sharpness of individual poles within a window, a substantial improvement to the word error rate is shown.

Using the representation of the temporal envelope, the processor may adaptively capture fine temporal nuances with millisecond accuracy while at the same time summarize the signal's gross temporal evolution in timescales of about 500 milliseconds or more. Fine time-adaptive accuracy may be used to pin-point significant moments in time such as, for example, those associated with transient events like stop bursts. At the same time, the long-timescale summarization power of temporal envelopes provide the ability to train, for example, speech recognizers on complete linguistic units lasting longer than 10 milliseconds and learning acoustically-feasible phoneme sequences.

The representation of the temporal envelope of a signal is created generally by applying a discrete cosine transform (DCT) on long time frames and a frequency domain linear prediction (FDLP) on the output of the DCT.

The DCT generally appears as a post-processing step in feature extractors for automatic speech recognition. The forward DCT of an N point real sequence x[n] may be defined as:

$$X_{DCT}[k] = a[k]\sum_{n=0}^{N-1} x[n]\cos\left(\frac{(2n+1)\pi k}{2N}\right)$$

where k=0, 1, . . . , N−1 and $$a[k] = \begin{cases} 1 & k=0 \\ \sqrt{2} & k=1, 2, \ldots, N-1 \end{cases}$$

In some embodiments, the DCT may be used to approximate the envelope of the dicrete Fourier transform (DFT). Denoting as $X_{DFT}[k]$, the DFT of a length 2N zero-padded version of x[n], it has been determined that the envelope of the DCT is bounded by the envelope of the zero-padded DFT and are related by:

$$X_{DCT}[k] = a[k]|X_{DFT}[k]|\cos\left(\theta[k] - \frac{\pi k}{2N}\right)$$

where k=0, 1, . . . , N−1, and $|X_{DFT}[k]|$ and $\theta[k]$ are the magnitude and phase of the zero-padded DFT, respectively.

FIG. 1 is a simplified illustration of a spectrogram of a speech sample and a spectrogram of the discrete cosine transformation (DCT) of the speech sample in accordance with some embodiments of the present invention. As shown in FIG. 1, spectrogram 110 is of a 2 second speech sample and spectrogram 120 is of a DCT transform of the whole sample (treating the DCT output sequence as a sequence in time). It should be noted that while the DCT spectrogram 120 appears to be a mirror image of the regular spectrogram 110, it is not due to the cosine modulating term in the above-mentioned equation.

FDLP, the frequency domain dual of the time domain linear prediction (TDLP), is the part of the model that provides the time adaptive behavior. TDLP is fully familiar to those of ordinary skill in the art. Applying FDLP analysis estimates the temporal envelope of the signal, and in particular, is the square of its Hilbert envelope, $$e(t) = F^{-1}\{\tilde{X}(\varsigma)\cdot\tilde{X}(\varsigma-f)d\varsigma\}$$

The Hilbert envelope is the inverse Fourier transform of the autocorrelation of the single sided (positive frequency) spectrum $\tilde{X}(f)$. The autocorrelation of the spectral coefficients may be used to predict the temporal envelope of the signal.

In some embodiments, the frequency domain linear prediction is performed by calculating the inverse Fourier transform of the magnitude-squared Fourier transform of a portion of the frequency domain representation raised to a given power. When the given power is 1, the autocorrelation is calculated (as shown in the equation above). When the given power is not 1, the psuedoautocorrelation is calculated.

Figure 2:
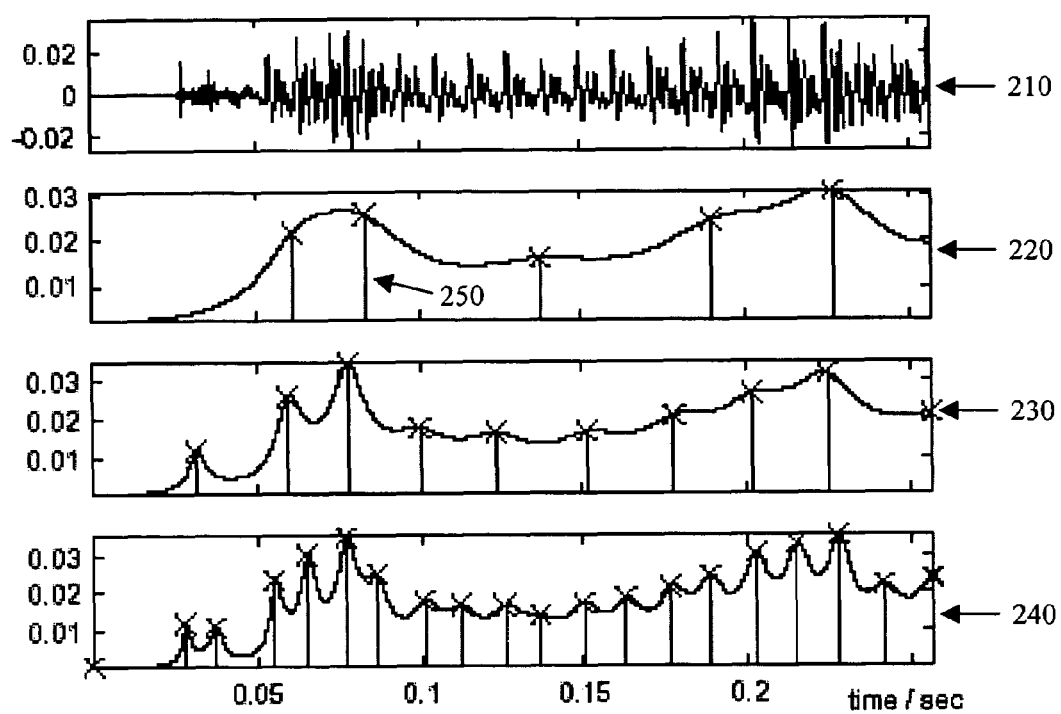
FIG. 2 is a simplified illustration of one example of a waveform and temporal envelopes of the waveform with various poles in accordance with some embodiments of the present invention.

FIG. 2 is a simplified illustration of one example of a waveform 210 and temporal envelopes 220, 230, and 240 of the waveform 210 with various poles 250 in accordance with some embodiments of the present invention. FIG. 2 shows a 256 millisecond long speech segment at a 8 kHz sample rate. After using the processor to take the 2048 point DCT of the whole sample, the processor fits a single FDLP polynomial to the DCT and then extracts the temporal envelope of the segment. Note that FIG. 2 shows the tradeoffs involved in model order selection (defining pole rate). When the processor generates an envelope 220 having 10 poles, the resulting envelope is too smooth and provides only a loose approximation. On the other hand, when the processor generates an envelope 240 having 40 poles, the resulting envelope is starting to fit the pitch pulses, which is generally something to avoid for English-language automatic speech recognition. When the processor generates an envelope 230 having 20 poles, this resulting envelope strikes a good balance as it captures both the gross variation as well as the stop burst transients in the beginning of the sample. Envelope 230 has a pole rate of 20 poles per 256 milliseconds or about 0.1 poles/ms. In accordance with some embodiments of the present invention, 20 poles per 256 milliseconds or a pole rate of 0.1 poles/millisecond is advantageously used in order to generate the model. It should be noted, however, that the poles are distributed adaptively within the 256 ms window, thereby providing flexibility to the model. It should also be noted that any suitable number of poles or pole rate may be determined and used by the processor.

Figure 3:
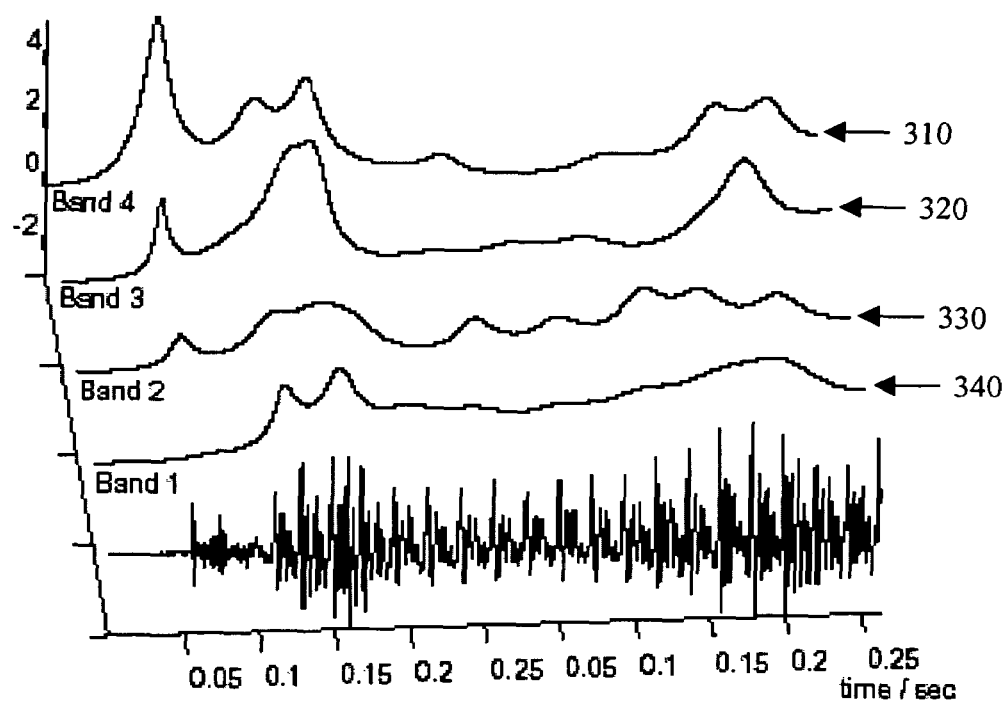
FIG. 3 is a simplified illustration of one example of a subband frequency-domain linear prediction (FDLP) in accordance with some embodiments of the present invention.

FIG. 3 is a simplified illustration of one example of a subband frequency-domain linear prediction (FDLP) in accordance with some embodiments of the present invention. In FIG. 3, the same 256 ms long sample is used, but the processor applies FDLP on four logarithmically-split octave bands 310, 320, 330, and 340. More particularly, each band represents a range of frequencies: 0-0.5, 0.5-1, 1-2, and 2-4 kHz, respectively. It should be noted that the same pole rate of 20 poles per 256 ms for each band is used. It should also be noted that the high frequency band is resolving the transient while the low frequency band is capturing the gross spectral variation. This approach is sometimes referred to herein as "subband FDLP." By transforming longer 256 ms blocks of signal (which is extensible to seconds or more), enough variation is captured to manifest itself as significantly different temporal envelopes between bands.

This approach provides a new parameter space from which features may be extracted for use in, for example, automatic speech recognition. There are many approaches in which the above-mentioned temporal envelope information modeled in FDLP may be converted into features for use in speech recognizers.

In some embodiments, the temporal envelopes may be used directly. The envelopes as shown in FIG. 2 are samples DFTs of the impulse responses (IR) of the all-pole filters that have been fit to the frequency domain. The basic linear prediction may be suitable for direct transformation into temporal-based features such as modulation spectra. In addition, relationships such as the direct transformation from prediction coefficients to cepstra may provide decorrelated features describing the temporal behavior in different subbands.

In another suitable embodiment, features may be derived from each individual pole in the model (i.e., the roots of the predictor polynomial). The angle of the pole on the z-plane corresponds to accurate timing information and the magnitude of the pole may provide knowledge about the energy of the signal. It should be noted that this is a smoothed approximation to the true Hilbert envelope. The sharpness of the pole (i.e., how closely it approaches the unit circle) relates to the dynamics of the envelope. For example, a sharper pole indicates more rapid variation of the envelope at that time.

The index of sharpness of the FDLP poles $\{\rho_i\}$ is defined by:

$$\rho_i = \frac{1}{1 - |\rho_i|}.$$

As pole magnitudes grow from zero to approaching the unit circle, $\rho_i$ grows from 1 to an unbounded large positive value.

Figure 4:
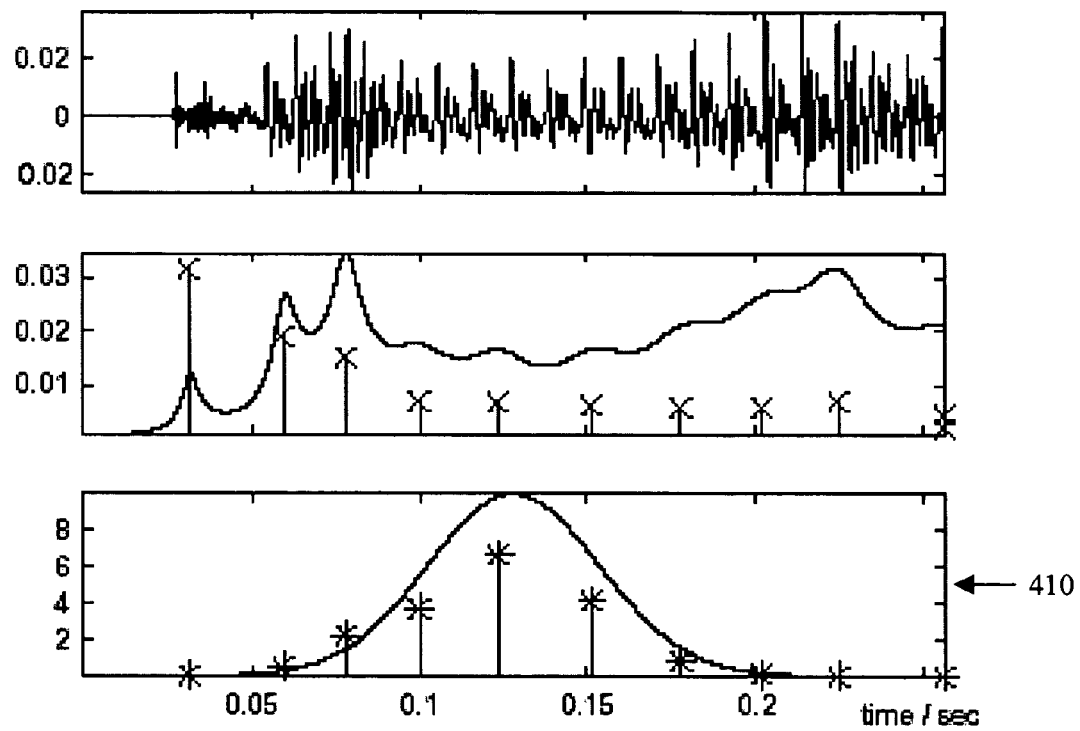
FIG. 4 is a simplified illustration of one example of a waveform, a temporal envelopes of the waveform modeled by FDLP, and a Gaussian window of the waveform in accordance with some embodiments of the present invention.
Figure 5:
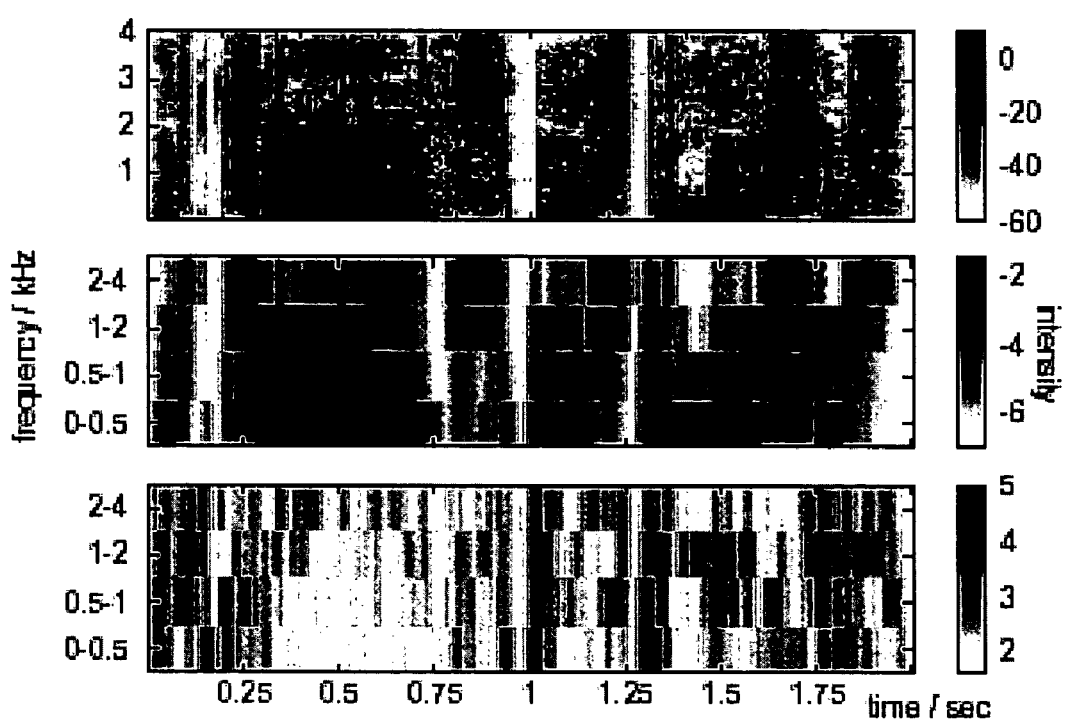
FIG. 5 is a simplified illustration of one example of a spectrogram of the speech sample, a per-frame maximum of the temporal envelope of the sample extracted in each band by FDLP, and sharpness index features in accordance with some embodiments of the present invention.

For each analysis frame in time, the full DCT is taken and FDLP is performed on 4 log bands using 20 poles per band. The choice of a 256 ms analysis window (2048 samples at 8 kHz) is, without loss of generality, dictated by computational considerations. Subbands are formed by breaking up the DCT into subranges that are exact powers of two (e.g., 128, 256, 512 and 1024 points for a 4-way split). After modeling with 20 poles per band per frame, the processor calculates the sharpness index. The sharpness indices may be scaled using a Gaussian window 410 to achieve a finer time resolution than the 256 ms window, as illustrated in FIG. 4, and the maximum value in each band in each frame is retained. The purpose of the window is to localize the sharpness values in the vicinity of the center of the frame. FIG. 5 visually compares these pole sharpness features with direct measures of the subband energy. After examining the distributions of the sharpness parameters, a logarithmic transform was added to make the distributions closer to Gaussian, and thus a better match to the statistical models.

Using a conventional HTK recognizer and Gaussian Mixture Model-Hidden Markov Model (GMM-HMM) models that are trained on a mixture of conversational and read speech using a combination of Switchboard, Callhome, and Macrophone databases, the temporal envelope modeled in FDLP was tested.

TABLE 1

Recognition of word error rate (WER) results.

| Features | raw 20k | pad 85k |
|---|---|---|
| PLP12 | 4.97% | 2.75% |
| FDLP-4log | 4.08% | 2.90% |
| FDLP-2log + dct | 3.81% | 2.82% |
| FDLP-3log + dct | | 2.61% |
| FDLP-4log + dct | | 2.63% |
| FDLP-5log + dct | | 2.69% |
| FDLP-8bark + dct | 4.38% | |

Table 1 shows the recognition word error rate (WER) results. The first line, "PLP12", is the baseline system employing 12th order PLP features (plus deltas and double deltas). Subsequent systems augment these features with FDLP sharpness features in various guises. "FDLP-4 log" adds four elements to each feature vector, derived from 4 logarithmically-spaced octave subbands (e.g., 0-500 Hz, 500 Hz-1 kHz, 1-2 kHz, and 2-4 kHz). It should be noted that performing a final DCT decorrelation on each frame of FDLP features improved recognition, as shown in the "FDLP-X log+dct" lines. Between two and five octave bands (where 2 octaves is 0-2 kHz and 2-4 kHz, and 5 octave bands is down to 0 to 250 Hz) were used to find the best compromise between signal detail and model accuracy (since narrow frequency bands contain fewer frequency samples with which to estimate the linear prediction parameters). In some embodiments, dividing the frequency axis on a Bark scale, which is fully familiar to those of ordinary skill in the art, may be used to allow the use of more bands (since Bark bands do not get narrow so quickly in the low frequencies).

In some embodiments, padding each end of our test utterances with 100 ms of artificial background noise silence may be beneficial. In some embodiments, all test set utterances marked as coming from the same speaker may be normalized. Such changes may improve the WER from about 4.97% to about 2.75%.

For the "raw 20 k" system, it should be noted that any kind of FDLP-derived information improved word error rate with the greatest improvement coming from augmenting the PLP features with decorrelated 4 octave-subband FDLP sharpness features ("FDLP-4 log+dct"). The WER changed from 4.97% to 3.81%, which represents a 23.3% relative improvement. With the larger, better-performing "pad 85 k" system, the improvements from FDLP were smaller with the best improvement of 2.75% baseline WER to 2.61% for 3 subband decorrelated features ("FDLP-3 log+dct") constituting a 5% relative improvement.

Figure 6:
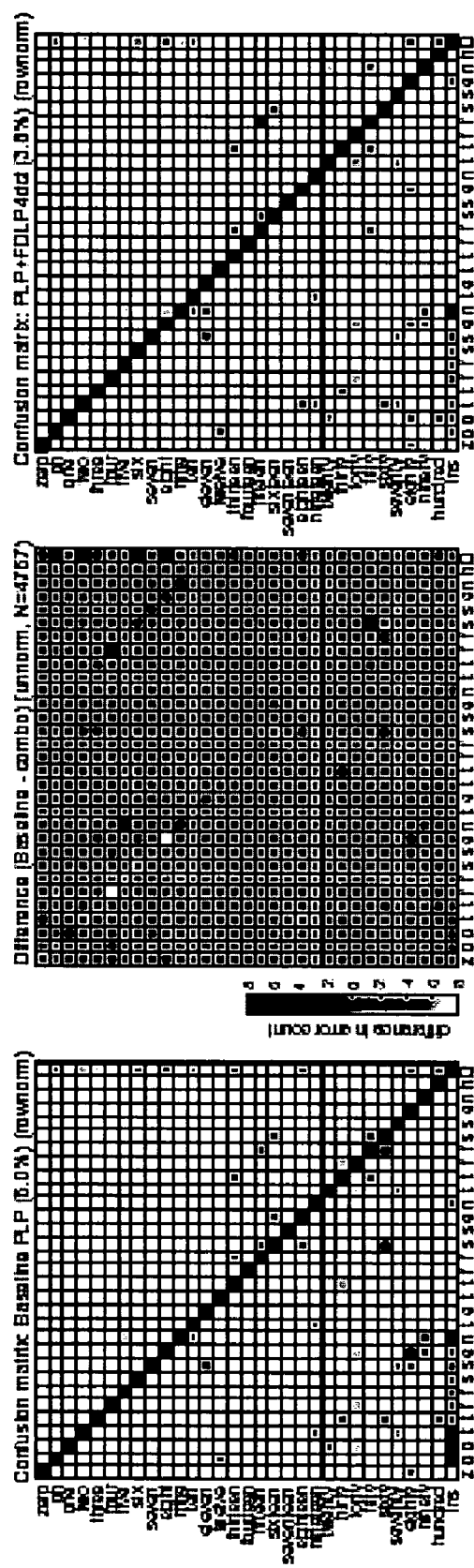
FIG. 6 shows the comparison between word-level confusion matrices in accordance with some embodiments of the present invention.

FIG. 6 compares the word-level confusion matrices for the baseline "raw 20 k" PLP system, and for the best performing "FDLP-4 log+dct" system. Looking at the absolute differences in error counts (middle pane), the greatest differences is seen for the words "four" (fewer confusions with "forty"), "eight" and "six" (fewer deletions), and "five" (fewer confusions with "nine"). It should be noted that most of these main differences involve stops (/t/ in "eight" and "forty", and /k/ is "six"), which is consistent with our initial drive for the FDLP sharpness features, of capturing information about short-duration transients in the speech signal.

Accordingly, FDLP analysis is advantageous because of its ability to describe temporal structure without frame-rate quantization, and its rich and flexible representation of temporal structure in the form of poles. This flexible, adaptive representation of the temporal structure may be analyzed across the full-band or for arbitrarily-spaced subbands, and presents many possibilities for advanced speech recognition features.

Perceptual Linear Prediction (PLP) is another auditory-based approach to feature extraction. In contrast to pure linear predictive analysis of speech, PLP generally uses several perceptually motivated transforms including Bark frequency, masking curves, etc. to modify the short-term spectrum of the speech. In accordance with some embodiments of the present invention, the temporal information extracted by FDLP may be combined with spectral information extracted using PLP.

As described above, a squared Hilbert envelope (the squared magnitude of the analytic signal) represents the total instantaneous energy in a signal, while the squared Hilbert envelopes of sub-band signals are a measure of the instantaneous energy in the corresponding sub-bands. Deriving these Hilbert envelopes generally involve either using a Hilbert operator in the time domain (which is difficult in practice because of its doubly-infinite impulse response), or the use of two Fourier transforms with modifications to the intermediate spectrum. Alternatively, an all-pole approximation of the Hilbert envelope may be calculated by computing a linear predictor for the positive half of the Fourier transform of an even-symmetrized input signal, which is equivalent to computing the predictor from the cosine transform of the signal. Such FDLP is the frequency-domain dual of the well-known TDLP. Similar to how the TDLP fits the power spectrum of an all-pole model to the power spectrum of a signal, FDLP fits a "power spectrum" of an all-pole model (e.g., in the time domain) to the squared Hilbert envelope of the input signal. To obtain such a model for a specific sub-band, the prediction may be based only on the corresponding range of coefficients from the original Fourier transform.

To summarize temporal dynamics, rather than capture every nuance of the temporal envelope, the all-pole approximation to the temporal trajectory offers parametric control over the degree to which the Hilbert envelope is smoothed (e.g., the number of peaks in the smoothed envelope cannot exceed half the order of the model).

Figure 7:
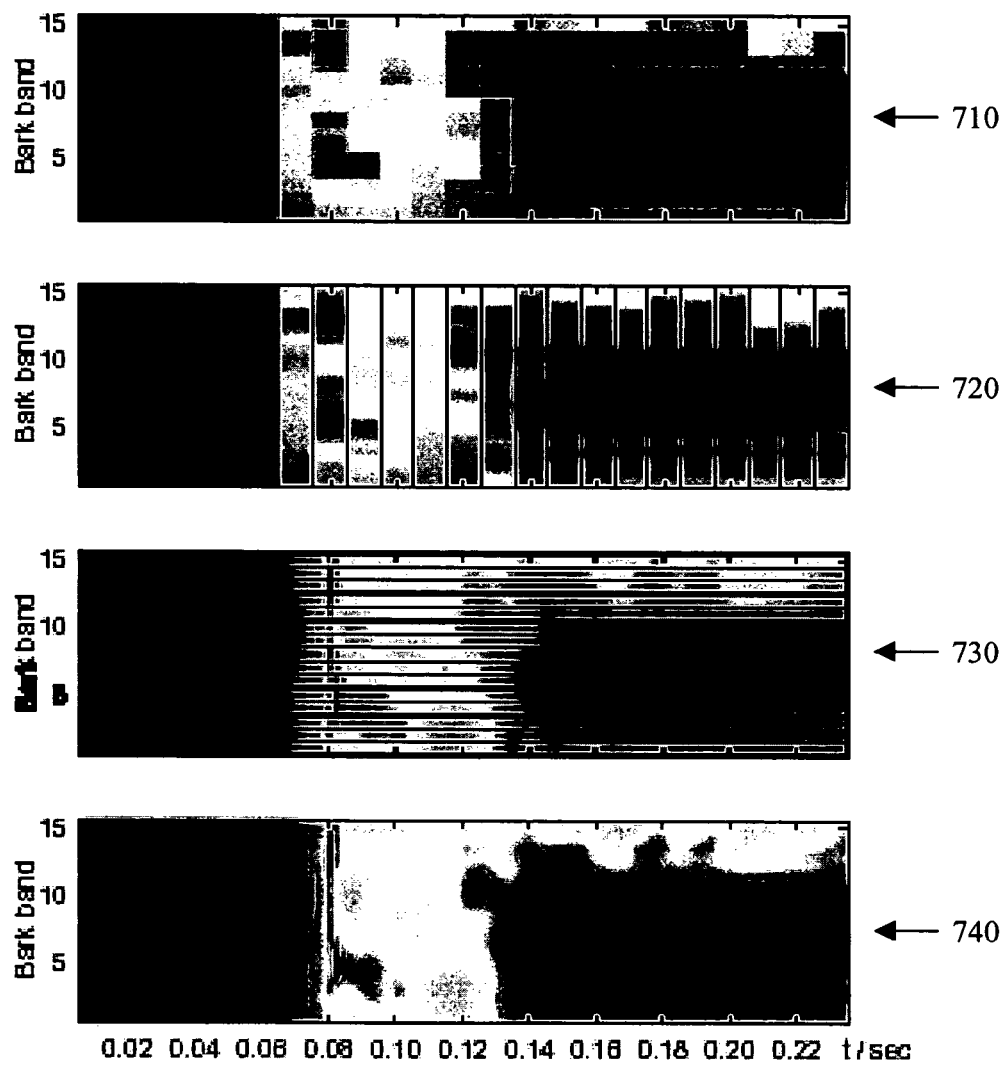
FIG. 7 is a simplified illustration of one example of a subband FDLP and one example of a PLP$^2$ in accordance with some embodiments of the present invention.

Having an approach for estimating temporal envelopes in individual frequency bands of the original signal permits the construction of a spectrogram-like signal representation. Just as a typical spectrogram is constructed by appending individual short-term spectral vectors alongside each other, a similar representation may be constructed by vertical stacking of the temporal vectors approximating the individual sub-band Hilbert envelopes, recalling the outputs of the separate band-pass filters used to construct the original, analog Spectrograph. This is shown in FIG. 7. The top panel 710 shows the time-frequency pattern obtained by short-term Fourier transform analysis and Bark scale energy binning to 15 critical bands, which is the way the short-term critical-band spectrum is derived in PLP feature extraction. The second panel 720 shows the result of PLP smoothing, with each 15-point vertical spectral slice now smooth and continuous as a result of being fit with a linear prediction model. The third panel 730 is based on a series 24-pole FDLP models, one for each Bark band, to give estimates of the 15 subband squared Hilbert envelopes. Similar to PLP, cube-root compression is applied here to the sub-band Hilbert envelope prior to computing the all-pole model of the temporal trajectory. The similarity of all these patterns is evident, but there are also some important differences: Whereas the binned, short-time spectrogram is 'blocky' in both time and frequency, the PLP model gives a smooth, continuous spectral profile at each time step. Conversely, the temporal evolution of the spectral energy in each sub-band is much smoother in the all-pole FDLP representation, constrained by the implicit properties of the temporal all-pole model.

In PLP, an auditory-like critical-band spectrum, obtained as the weighted summation of the short-term Fourier spectrum followed by cube-root amplitude compression, is approximated by an all-pole model in an approach similar to the way that linear prediction techniques approximate the linear-frequency short-term power spectrum of a signal. Sub-band FDLP offers an alternative approach to estimate the energy in each critical band as a function of time, raising the possibility of replacing the short-term critical band spectrum in PLP with this new estimate. In doing so, a new representation of the critical-band time-frequency plane is obtained. However, comparing this new representation to the subband FDLP spectrotemporal pattern (constrained by the all-pole model along the temporal axis), the all-pole constraint is now along the spectral dimension of the pattern.

In some embodiments, the processor may repeat the processing along the temporal dimension of the new representation to enforce the all-pole constraints along the time axis. The outcome of such processing may be subject to another stage of all-pole modeling on the spectral axis. It should be noted that this alternation may be iterated until the difference between successive representations is negligible.

As a result, the processor provides a two-dimensional spectro-temporal auditory-motivated pattern that is constrained by all-pole models along both the time and frequency axes. This is sometimes referred to herein as "Perceptual Linear Prediction Squared" or "$PLP^2$." The perceptual constraints are derived from the use of a critical-band frequency axis and from the use of a 250 ms critical-timespan interval, whereas the linear prediction (LP) portion indicates the use of all-pole modeling and the "squared" portion comes from the use of all-pole models along both the time and frequency axes.

In response to the processor taking the DCT of a 250 ms speech segment (equivalent to the Fourier transform of the related 500 ms even symmetric signal) at a sampling rate of 8 kHz, about 2000 unique values in the frequency domain are generated. The processor may then divide these into 15 bands with overlapping Gaussian windows whose widths and spacing select frequency regions of approximately one Bark, and apply 24th order FDLP separately on each of the 15 bands such that each predictor approximates the squared Hilbert envelope of the corresponding sub-band. The processor computes the critical-band time-frequency pattern within the 250 ms time span by sampling each all-pole envelope at 240 points (i.e. every 1.04 ms) and stacks the temporal trajectories vertically. This provides a 2-dimensional array amounting to a spectrogram, but constructed row-by-row, rather than column-by-column as in conventional short-term analysis. This time-frequency pattern is the starting point for further processing.

Figure 9:
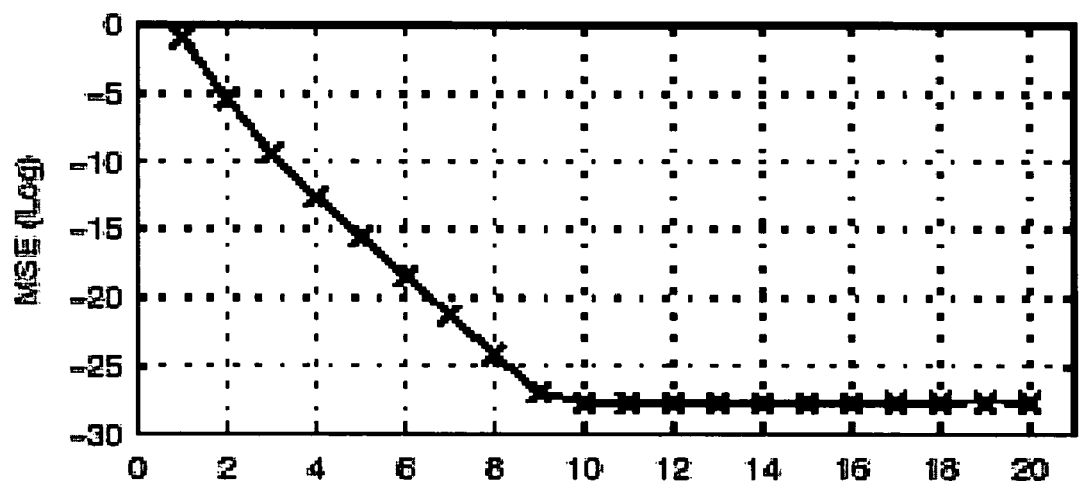
FIG. 9 shows the mean-squared differences between the log-magnitude surfaces obtained in successive iterations of the PLP$^2$ analysis in accordance with some embodiments of the present invention.

In response to generating the above-mentioned time-frequency pattern, the processor may compute 240 12th-order time-domain LP (TDLP) models to model the spectra constituted by the 15 amplitude values in a vertical slice from the pattern at each of the 240 temporal sample points. The spectral envelopes of these models are each sampled at 120 points (i.e. every 0.125 Bark) and stacked next to each other to form a new 240×120=28,800 point spectro-temporal pattern. Each horizontal slice of 240 points is modeled by the same process of mapping a compressed magnitude "spectrum" to an autocorrelation and then to an all-pole model, thereby yielding 120 24th-order FDLP approximations to the temporal trajectories in the new fractional-Bark subbands. Sampling these models on the same 240 point grid gives the next iteration of the 28,800 point spectro-temporal pattern. The process may then repeats where it converges after a given number of iterations, where the number of iterations required for convergence appears to depend on the models orders as well as the compression factor in the all-pole modeling process. The mean-squared difference between the logarithmic surfaces of the successive spectro-temporal patterns as a function of the iteration number is shown in FIG. 9, which shows stabilization after 10 iterations in this example. (Although this plot shows that the differences between successive iterations do not decline all the way to zero, it should be noted that the residual changes in later iterations are immaterial; inspection of the time frequency distribution of these differences reveals no significant structure.)

The final panel 740 of FIG. 7 shows the results of the new PLP compared with conventional PLP. The increased temporal resolution in comparison with the 10 ms sampled PLP (second panel 720) is very clear; the second important property of the $PLP^2$ surface is the increased spectral resolution in comparison with the 15 frequency values at each time for the basic FDLP model (third panel 730).

Figure 8:
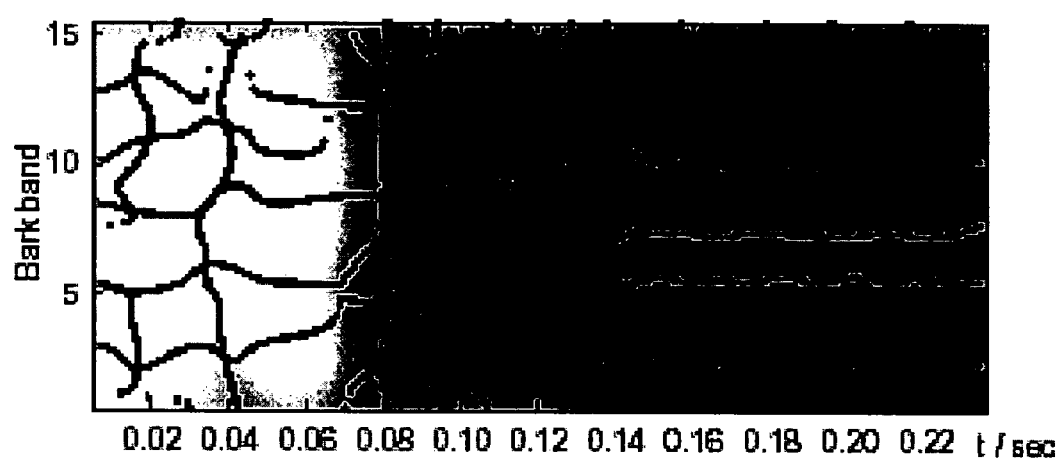
FIG. 8 is a simplified illustration of PLP$^2$ having pole locations in accordance with some embodiments of the present invention.

In some embodiments, further insight may be obtained by plotting the pole locations on the time frequency plane. As shown in FIG. 8, the pole locations may be superimposed on a grayscale version of the $PLP^2$ pattern presented on the 4th panel of FIG. 7. Dots show the 12 FDLP poles for each of the 120 subband envelope estimates. Due to the dense frequency sampling, the poles of adjacent bands are close in value, and the dots merge into near-vertical curves in the figure. Dots are the 6 TDLP poles at each of the 240 temporal sample points, and merge into near-horizontal lines.

The blue TDLP poles track the smoothed formants in the t=0.14 to 0.24 s region but fail to capture the transient at around 0.08 s. The red FDLP poles, on the other hand, with their emphasis on temporal modeling, make an accurate description of this transient. As expected, neither TDLP or FDLP models track any energy peaks in the quiet region between 0 and 0.08 s. But, while the TDLP models for these temporal slices are obliged to place their poles somewhere in this region, the FDLP models are free to shift the majority of their poles into the later portion of the time window, between 0.08 and 0.25 s, where the bulk of the energy lies.

In some embodiments, after receiving a 250 ms segment of speech, the processor divides its DCT into 15 Bark bands. Each band is fit with a 12th order FDLP polynomial, and the resulting smoothed temporal envelope is sampled on a 10 ms grid. The central-most spectral slices are then smoothed across frequency using the conventional PLP technique. However, it should be noted that any further iterations are not performed. Instead, the cepstra resulting from this stage are taken as replacements for the conventional PLP features and input to the recognizer.

Thus far, these features have indeed shown performance very close to standard PLP features, achieving word error that differ by less than 2% relative. Although small, these differences are statistically very significant, and when the results from a $PLP^2$ system are combined with conventional system outputs using simple word-level voting, a significant improvement in overall accuracy is achieved.

Alternatively, techniques for reducing the smoothed energy surface to a lower-dimensional description appropriate for statistical classifiers include conventional basis decompositions such as Principal Component Analysis or two-dimensional DCTs.

In another suitable embodiment, the pole locations may be viewed as a reduced, parametric description of the energy concentrations. For example, recording the crossing points of the nearly-continuous time and frequency pole trajectories may provide a highly compact description of the principal energy peaks in each 250 ms spectro-temporal window.

Accordingly, a new modeling scheme to describe the time and frequency structure in short segments of sound is provided. This approach of all-pole (linear predictive) modeling, applied in both the time and frequency domains, allows one to smooth this representation to adaptively preserve the most significant peaks within this window in both dimensions.

Figure 10:
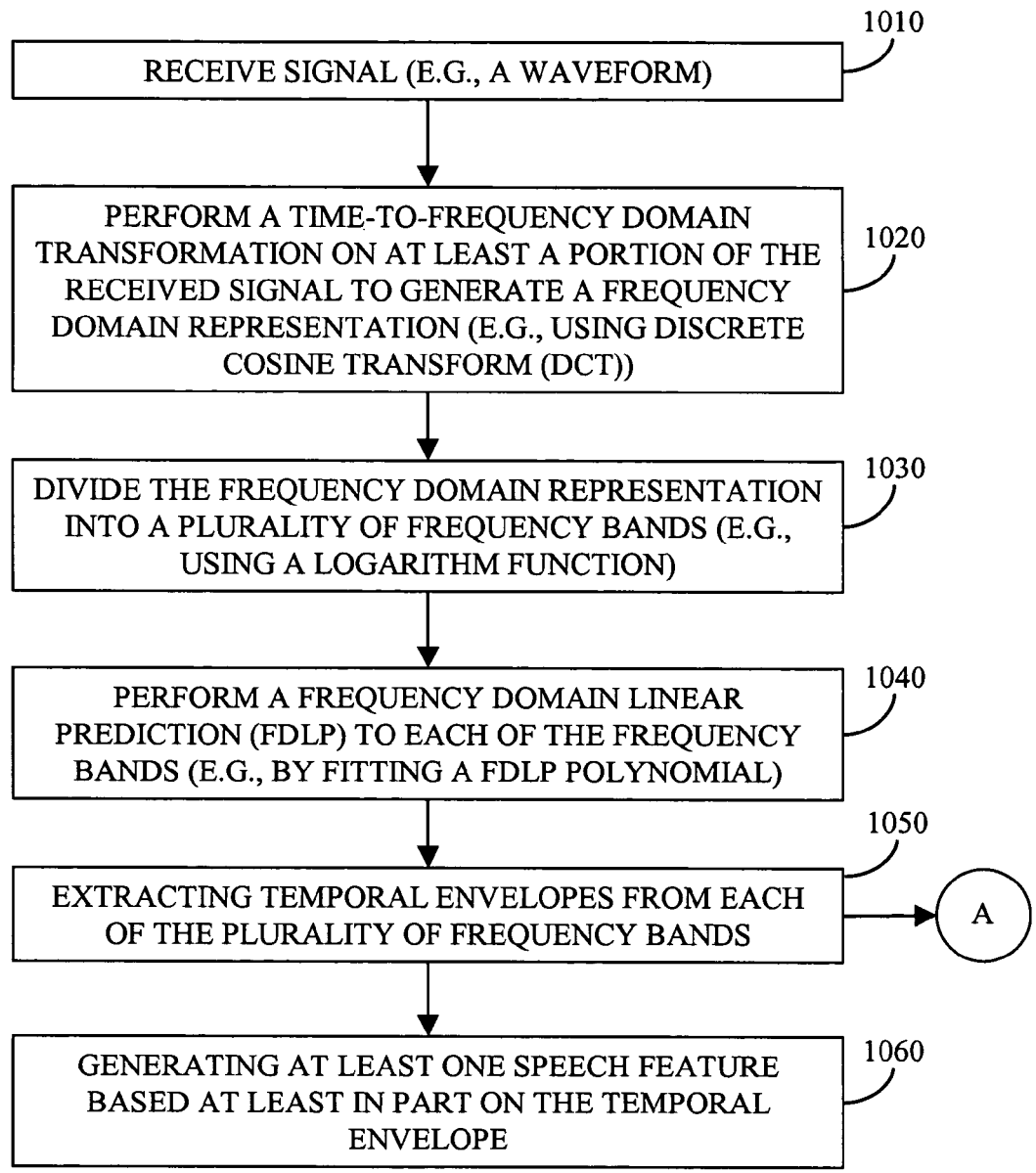
FIG. 10 is a simplified flowchart illustrating the steps performed in using frequency domain linear prediction to estimate the temporal envelope of a frequency domain representation in accordance with some embodiments of the present invention.
Figure 11:
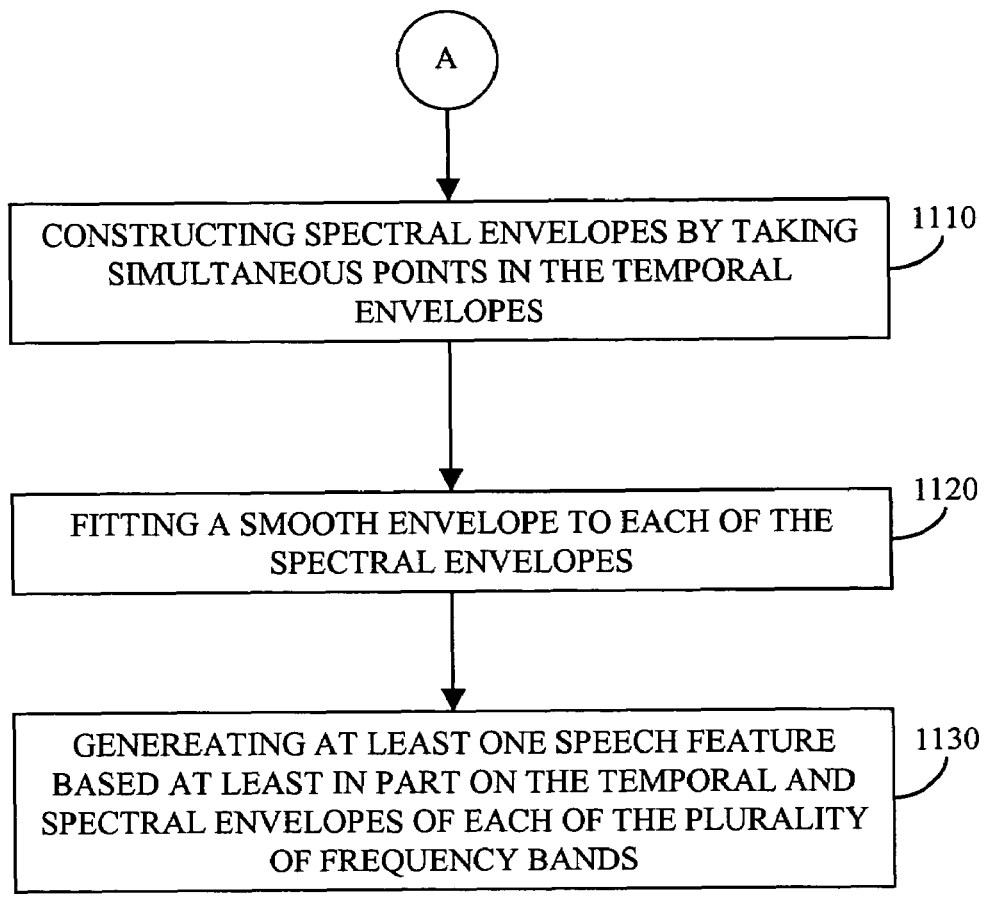
FIG. 11 is a simplified flowchart illustrating the steps performed in combining the temporal information extracted by FDLP with spectral information extracted by PLP to extract one or more speech features in accordance with some embodiments of the present invention.

FIGS. 10 and 11 are generalized flow charts illustrating the steps performed in the modeling and representing of the temporal structure of audio signals in accordance with some embodiments of the present invention. It will be understood that the steps shown in these figures may be performed in any suitable order, some may be deleted, and others added.

FIG. 10 is a simplified flow chart illustrating the steps performed in extracting speech features from signals by using FDLP in accordance with some embodiments of the present invention. At step 1010, the process may receive a signal (e.g., a waveform). In response to receiving a signal, a time-to-frequency domain transformation on at least a portion of the received signal to generate a frequency domain representation is performed at step 1020. The time-to-frequency domain transformation converts the signal from a time domain representation to the frequency domain representation. In some embodiments, the time-to-frequency domain transformation is performed by applying a discrete cosine transform (DCT) or a discrete Fourier transform on the portion of the received signal.

At step 1030, the processor may divide the frequency domain representation into a plurality of frequency bands. For example, subbands may be formed breaking up the frequency domain representation into subranges. These subbands may be determined by logarithmically splitting the frequency domain representation into the plurality of frequency bands.

At step 1040, the processor may perform a frequency domain linear prediction (FDLP) on each of the frequency bands by, for example, fitting a FDLP polynomial. The frequency domain linear prediction is performed by estimating the square of the Hilbert envelope of the signal or calculating the inverse Fourier transform of the magnitude-squared Fourier transform of a portion of the frequency domain representation raised to a given power. When the given power is 1, the autocorrelation of the single sided (positive frequency) spectrum is calculated. Alternatively, when the given power is not 1, the pseudoautocorrelation is calculated. The autocorrelation of the spectral coefficients may be used to predict the temporal envelope of the signal.

In some embodiments, the frequency domain linear prediction may include selecting a temporal window to apply the linear prediction and automatically determining a pole rate to distribute poles for modeling the temporal envelope. The poles generally characterize the temporal peaks of the temporal envelope. The pole rate may be automatically determined to capture both gross variation and stop burst transients of the signal.

In some embodiments, an index of sharpness may be extracted from each of the poles. The sharpness of the pole relates to the dynamics of the temporal envelope. The index of sharpness of the FDLP poles $\{\rho_i\}$ is defined as $$\rho_i = \frac{1}{1 - |\rho_i|}.$$

Temporal envelopes may be extracted from each of the plurality of frequency bands using the fitted FDLP polynomial at step 1050.

In some embodiments, the temporal envelope may be used to generate at least one speech feature. Speech features may be used for sound recognition (in particular, speech recognition), sound encoding and decoding, and artificial sound synthesis.

FIG. 11 is a simplified flowchart illustrating the steps performed in combining the temporal information extracted by FDLP with spectral information extracted by PLP to extract one or more speech features in accordance with some embodiments of the present invention. In response to extracting temporal envelopes from the audio signal using FDLP, the process may construct spectral envelopes by, for example, taking simultaneous points in the temporal envelopes (step 1110). For example, the processor may compute time-domain linear prediction models to model the spectra constituted by the points in the temporal envelopes. In some embodiments, the processor may iterate the fitting in frequency and time domains.

A smooth envelope may be fitted to each of the spectral envelopes at step 1120. The smoothing of the spectral envelopes may be achieved by fitting a linear prediction polynomial to each of the spectral envelopes. This may be performed by calculating the inverse Fourier transform of the Fourier transform magnitude of the spectral envelope raised to a given power. In some embodiments, the spectral envelopes may be modified by a nonlinear warping of the frequency axis and/or the time axis.

Based on both the temporal and spectral envelopes, one or more speech features are generated at step 1130. Speech features may be used for sound recognition (e.g., speech recognition), sound encoding and decoding, and artificial sound synthesis. For example, an ASR system may be tuned for various speech recognition tasks by using the improved speech features generated by the methods and systems of the present invention. Some applications in which such an ASR system with improved speech modeling may be used are, for example, cellular telephones (e.g., automatic dialing in response to receiving a voice command), telephone directories, software for operating a computer, data entry, automobile controls, etc.

Figure 12:
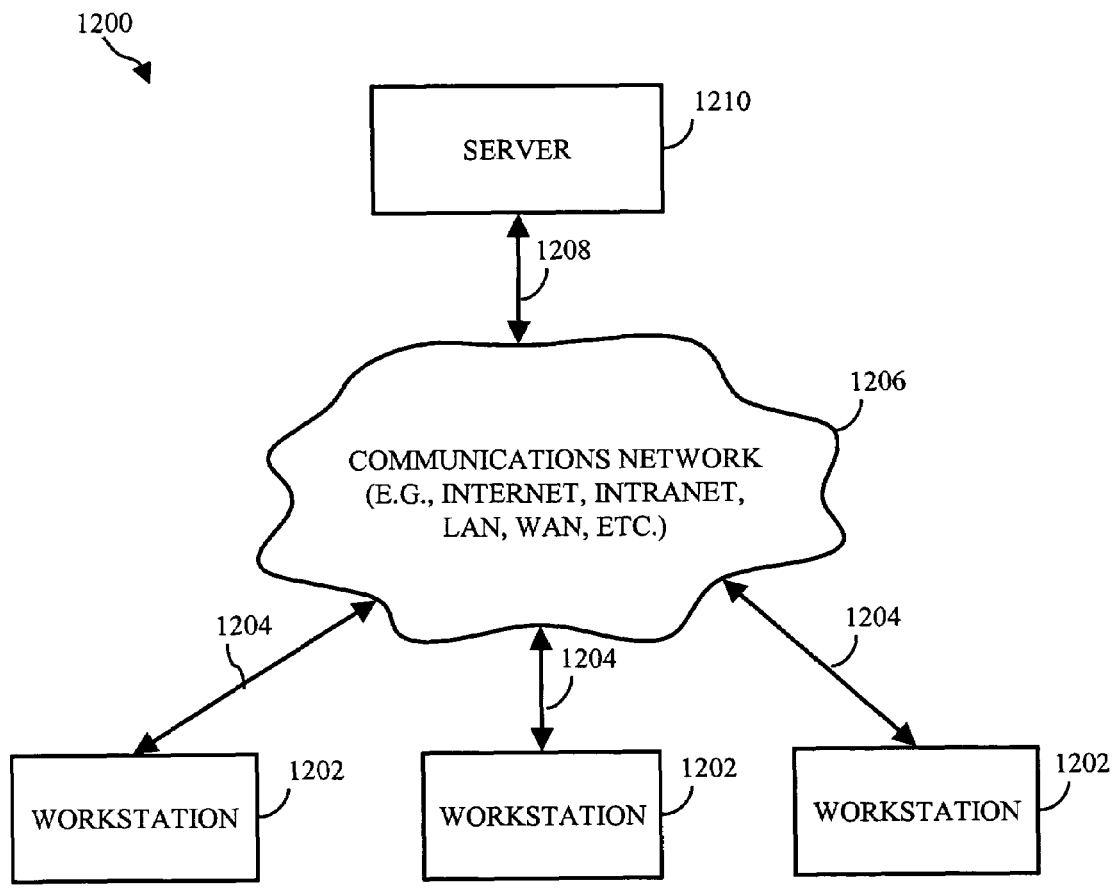
FIG. 12 is a schematic diagram of an illustrative system suitable for implementation of an application that uses the temporal structure model in accordance with some embodiments of the present invention.

FIG. 12 is a schematic diagram of an illustrative system 1200 suitable for implementation of an application that generates and uses the temporal structure model for speech recognition, sound encoding, sound decoding, and sound synthesis in accordance with some embodiments of the present invention. Referring to FIG. 12, an exemplary system 1200 for implementing the present invention is shown. As illustrated, system 1200 may include one or more workstations 1202. Workstations 1202 may be local to each other or remote from each other, and are connected by one or more communications links 1204 to a communications network 1206 that is linked via a communications link 1208 to a server 1210.

In system 1200, server 1210 may be any suitable server for providing access to the application or to the temporal structure model, such as a processor, a computer, a data processing device, or a combination of such devices. Communications network 1206 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 1204 and 1208 may be any communications links suitable for communicating data between workstations 1202 and server 1210, such as network links, dial-up links, wireless links, hard-wired links, etc. Workstations 1202 enable a user to access features using the temporal structure model. Workstations 1202 may be personal computers, laptop computers, mainframe computers, dumb terminals, data displays, Internet browsers, personal digital assistants (PDAs), two-way pagers, wireless terminals, portable telephones, etc., or any combination of the same.

Figure 13:
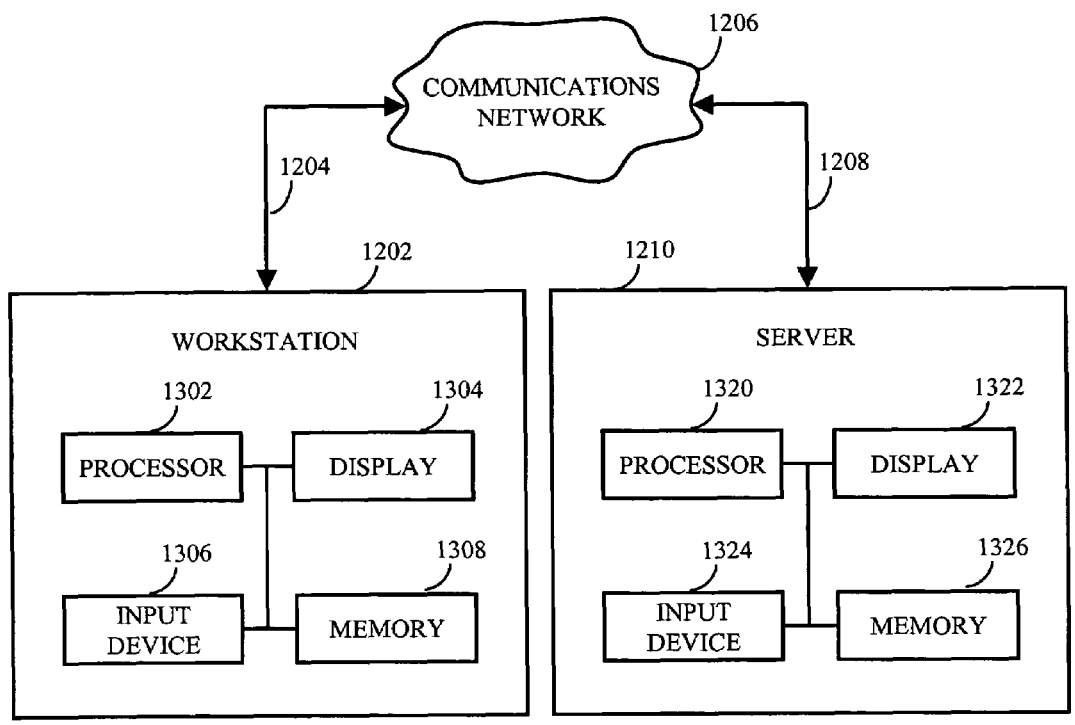
FIG. 13 is a detailed example of the server and one of the workstations that may be used in accordance with some embodiments of the present invention.

The server and one of the workstations, which are depicted in FIG. 12, are illustrated in more detail in FIG. 13. Referring to FIG. 13, workstation 1202 may include processor 1302, display 1304, input device 1306, and memory 1308, which may be interconnected. In a preferred embodiment, memory 1308 contains a storage device for storing a workstation program for controlling processor 1302. Memory 1308 also preferably contains the application according to the invention.

In some embodiments, the application may include an application program interface (not shown), or alternatively, as described above, the application may be resident in the memory of workstation 1202 or server 1210. In another suitable embodiment, the only distribution to the user may be a Graphical User Interface which allows the user to interact with the application resident at, for example, server 1210.

In one particular embodiment, the application may include client-side software, hardware, or both. For example, the application may encompass one or more Web-pages or Web-page portions (e.g., via any suitable encoding, such as Hyper-Text Markup Language (HTML), Dynamic HyperText Markup Language (DHTML), Extensible Markup Language (XML), JavaServer Pages (JSP), Active Server Pages (ASP), Cold Fusion, or any other suitable approaches).

Although the application is described herein as being implemented on a workstation, this is only illustrative. The application may be implemented on any suitable platform (e.g., a personal computer (PC), a mainframe computer, a dumb terminal, a data display, a two-way pager, a wireless terminal, a portable telephone, a portable computer, a palmtop computer, a H/PC, an automobile PC, a laptop computer, a personal digital assistant (PDA), a combined cellular phone and PDA, etc.) to provide such features.

Processor 1302 uses the workstation program to present on display 1304 the application and the data received through communication link 1204 and commands and values transmitted by a user of workstation 1202. Input device 1306 may be a computer keyboard, a cursor-controller, a microphone, a dial, a switchbank, lever, or any other suitable input device as would be used by a designer of input systems or process control systems.

Server 1210 may include processor 1320, display 1322, input device 1324, and memory 1326, which may be interconnected. In a preferred embodiment, memory 1326 contains a storage device for storing data received through communication link 1208 or through other links, and also receives commands and values transmitted by one or more users. The storage device further contains a server program for controlling processor 1320.

It will also be understood that the detailed description herein may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

The system according to the invention may include a general purpose computer, or a specially programmed special purpose computer. The user may interact with the system via e.g., a personal computer or over PDA, e.g., the Internet an Intranet, etc. Either of these may be implemented as a distributed computer system rather than a single computer. Similarly, the communications link may be a dedicated link, a modem over a POTS line, the Internet and/or any other method of communicating between computers and/or users. Moreover, the processing could be controlled by a software program on one or more computer systems or processors, or could even be partially or wholly implemented in hardware.

Although a single computer may be used, the system according to one or more embodiments of the invention is optionally suitably equipped with a multitude or combination of processors or storage devices. For example, the computer may be replaced by, or combined with, any suitable processing system operative in accordance with the concepts of embodiments of the present invention, including sophisticated calculators, hand held, laptop/notebook, mini, mainframe and super computers, as well as processing system network combinations of the same. Further, portions of the system may be provided in any appropriate electronic format, including, for example, provided over a communication line as electronic signals, provided on CD and/or DVD, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an object oriented and/or interpretive environment such as Java and transported to multiple destinations to various users.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

The following references are incorporated by reference herein in their entireties:

M. Athineos and D. P. W. Ellis, "Sound texture modeling with linear prediction in both time and frequency domains," in Proc. ICASSP, 2003, vol. 5, pp. 648-651.

H. Hermansky and S. Sharma, "Temporal patterns (TRAPs) in ASR of noisy speech," in Proc. ICASSP, March 1999, vol. 1, pp. 289-292.

H. Hermansky and N. Morgan, "RASTA processing of speech," in Trans. Speech and Audio Processing, October 1994, vol. 2:4, pp. 578-589.

J. Tribolet and R. Crochiere, "Frequency domain coding of speech," in Trans. ASSP, October 1979, vol. 27, pp. 512-530.

J. Herre and J. D. Johnston, "Enhancing the Performance of Perceptual Audio Coders by Using Temporal Noise Shaping (TNS)," in Proc. 101st AES Conv., November 1996.

L. Rabiner and R. Schafer, Digital processing of speech signals, Prentice Hall, 1978.

Ozgur Cetin and Mari Ostendorf, "Cross-stream observation dependencies for multi-stream speech recognition," in Eurospeech, Geneva, 2003.

P. Somervuo, B. Chen, and Q. Zhu, "Feature transformations and combinations for improving ASR performance," in Eurospeech, Geneva, 2003.

H. Hermansky, H. Fujisaki, and Y. Sato, "Analysis and synthesis of speech based on spectral transform linear predictive method," in Proc. ICASSP, April 1983, vol. 8, pp. 777-780.

S. Sharma, H. Versnel, and N. Kowalski, "Ripple analysis in ferret primary auditory cortex: I. Response characteristics of single units to sinusoidally rippled spectra," Aud. Neurosci., vol. 1, 1995.

D. Klein, D. Depireux, J. Simon, and S. Sharma, "Robust spectro-temporal reverse correlation for the auditory system: Optimizing stimulus design," J. Comput. Neurosci, vol. 9, 2000.

H. Hermansky, "Exploring temporal domain for robustness in speech recognition," in Proc. of 15th International Congress on Acoustics, vol. II, Trondheim, Norway, June 1995.

H. Hermansky, "Should recognizers have ears?" Speech Communication, vol. 25, 1998.

H. Hermansky and S. Sharma, "TRAPS—classifiers of temporal patterns," in Proc. ICSLP, Sydney, Australia, 1998.

P. Jain and H. Hermansky, "Beyond a single critical band in TRAP based ASR," in Proc. Eurospeech, Geneva, Switzerland, November 2003.

S. Makino, T. Kawabata, and K. Kido, "Recognition of consonant based on the perception model," in Proc. ICASSP, Boston, Mass., 1983.

P. Brown, "The acoustic-modeling problem in automatic speech recognition," Ph.D. dissertation, Computer Science Department, Carnegie Mellon University, 1987.

H. Hermansky, D. Ellis, and S. Sharma, "Connectionist feature extraction for conventional hmm systems," in Proc. ICASSP, Istanbul, Turkey, 2000.

M. Fanty and R. Cole, "Spoken letter recognition," in Advances in Neural Information Processing Systems 3, Morgan Kaufmann Publishers, Inc., 1990.

S. Sharma, D. Ellis, S. Kajarekar, P. Jain, and H. Hermansky, "Feature extraction using non-linear transformation for robust speech recognition on the AURORA data-base," in Proc. ICASSP, Istanbul, Turkey, 2000.

P. Schwartz, P. Matejka, and J. Cernocky, "Recognition of phoneme strings using TRAP technique," in Proc. Eurospeech, Geneva, Switzerland, September 2003.

M. Athineos and D. Ellis, "Frequency-domain linear prediction for temporal features," in Proc. IEEE ASRU Workshop, St. Thomas, US Virgin Islands, December 2003.

H. Hermansky, H. Fujisaki, and Y. Sato, "Analysis and synthesis of speech based on spectral transform linear predictive method," in Proc. ICASSP, vol. 8, April 1983, pp. 777-780.

R. Koenig, H. Dunn, and L. Lacey, "The sound spectrograph," J. Acoust. Soc. Am., vol. 18, pp. 19-49, 1946.

H. Hermansky, "Perceptual linear predictive (PLP) analysis of speech," J. Acoust. Soc. Am., vol. 87:4, April 1990.

M. Athineos, H. Hermansky, and D. Ellis, "$PLP^2$: Autoregressive modeling of auditory-like 2-D spectro-temporal patterns," Submitted to SAPA-04, Jeju Island, Korea, October 2004.

What is claimed is:

1. An electronic method of extracting speech features from signals for use in performing automatic speech recognition, the method comprising using a computer processor to perform:
   receiving a signal;
   performing a time-to-frequency domain transformation on at least a portion of the received signal to generate a frequency domain representation;
   dividing the frequency domain representation into a plurality of frequency bands;
   fitting a FDLP polynomial to each of the plurality of frequency bands;
   performing a frequency-to-time domain transformation to extract temporal envelopes from each of the plurality of frequency bands using the fitted FDLP polynomial;
   constructing spectral envelopes by taking a plurality of points at each of a plurality of time values in the temporal envelopes, wherein each of the spectral envelopes has points taken at a particular one of the time values;
   fitting a smooth envelope to each of the spectral envelopes; and
   generating at least one speech feature based at least in part on the temporal and spectral envelopes of each of the plurality of frequency bands.

2. The method of claim 1, wherein the step of fitting a smooth envelope to each of the spectral envelopes further comprises iterating the fitting in frequency and time domains.

3. The method of claim 1, wherein the smooth envelope is fitted by fitting a linear prediction polynomial to each of the spectral envelopes.

4. The method of claim 3, wherein the linear prediction polynomial is fitted by calculating the inverse Fourier transform of the magnitude Fourier transform of the spectral envelope raised to a given power.

5. The method of claim 1, further comprising modifying each of the spectral envelopes by nonlinearly warping the frequency axis.

6. The method of claim 1, further comprising modifying each of the spectral envelopes by nonlinearly warping the time axis.

7. A system for extracting speech features from signals for use in performing automatic speech recognition, the system comprising:
   means for receiving a signal;
   means for performing a time-to-frequency domain transformation on at least a portion of the received signal to generate a frequency domain representation;
   means for dividing the frequency domain representation into a plurality of frequency bands;
   means for fitting a FDLP polynomial to each of the plurality of frequency bands;
   means for performing a frequency-to-time domain transformation to extract temporal envelopes from each of the plurality of frequency bands using the fitted FDLP polynomial;
   means for constructing spectral envelopes by taking a plurality of points at each of a plurality of time values in the temporal envelopes, wherein each of the spectral envelopes has points taken at a particular one of the time values;
   means for fitting a smooth envelope to each of the spectral envelopes; and
   means for generating at least one speech feature based at least in part on the temporal and spectral envelopes of each of the plurality of frequency bands.

8. A system for extracting speech features from signals for use in performing automatic speech recognition, the system comprising:
   a processor at least partially executing a modeling application configured to:
   receive a signal;
   perform a time-to-frequency domain transformation on at least a portion of the received signal to generate a frequency domain representation;
   divide the frequency domain representation into a plurality of frequency bands;
   fit a FDLP polynomial to each of the plurality of frequency bands;

perform a frequency-to-time domain transformation to extract temporal envelopes from each of the plurality of frequency bands using the fitted FDLP polynomial;

construct spectral envelopes by taking a plurality of points at each of a plurality of time values in the temporal envelopes, wherein each of the spectral envelopes has points taken at a particular one of the time values;

fit a smooth envelope to each of the spectral envelopes; and generate at least one speech feature based at least in part on the temporal and spectral envelopes of each of the plurality of frequency bands.

9. A computer readable medium for storing computer executable instructions for extracting speech features from signals, the executable instructions comprising the steps of:

receiving a signal;

performing a time-to-frequency domain transformation on at least a portion of the received signal to generate a frequency domain representation;

dividing the frequency domain representation into a plurality of frequency bands;

fitting a FDLP polynomial to each of the plurality of frequency bands;

performing a frequency-to-time domain transformation to extract temporal envelopes from each of the plurality of frequency bands using the fitted FDLP polynomial;

constructing spectral envelopes by taking a plurality of points at each of a plurality of time values in the temporal envelopes, wherein each of the spectral envelopes has points taken at a particular one of the time values;

fitting a smooth envelope to each of the spectral envelopes; and generating at least one speech feature based at least in part on the temporal and spectral envelopes of each of the plurality of frequency bands.

* * * * *